United States Patent
Morales (10) Patent No.: US 11,579,815 B1
(45) Date of Patent: Feb. 14, 2023

(54) METHODS AND SYSTEM FOR IMPLEMENTING PRINT OPTIONS FOR A PRINTING DEVICE USING VISUAL INFORMATION

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 17/388,464

(22) Filed: Jul. 29, 2021

(51) Int. Cl.
*G06F 3/12* (2006.01)
*H04N 1/00* (2006.01)

(52) U.S. Cl.
CPC .......... *G06F 3/1205* (2013.01); *G06F 3/1204* (2013.01); *G06F 3/1208* (2013.01); *G06F 3/1255* (2013.01); *G06F 3/1256* (2013.01); *H04N 1/00411* (2013.01); *H04N 1/00503* (2013.01); *G06F 3/1288* (2013.01)

(58) Field of Classification Search
None
See application file for complete search history.

(56) References Cited

U.S. PATENT DOCUMENTS

| | | | |
|---|---|---|---|
| 7,190,467 B2 | 3/2007 | Simpson et al. | |
| 2005/0174599 A1* | 8/2005 | Ferlitsch | G06F 3/1285 358/1.15 |
| 2014/0126013 A1* | 5/2014 | Shin | G06F 3/1219 358/1.15 |
| 2015/0206036 A1* | 7/2015 | Byer | G06F 3/1205 358/1.13 |

* cited by examiner

*Primary Examiner* — Frantz Bataille
(74) *Attorney, Agent, or Firm* — Millen, White, Zelano & Branigan, P.C.; William F. Nixon (57) ABSTRACT

A printing system includes a printing device having a digital front end (DFE) and at least one client device that sends print jobs to the printing device. The DFE stores a device capability file that sets forth device and print options available for the printing device. The print options include a priority value, an option type, a grouping option, a print option icon, and a preview overlay graphic. A copy of the device capability file is made available to a client application on the client device. The client application retrieves all the print information from the device capability file. The client application also presents and previews the print options using the appropriate preview graphic overlay.

20 Claims, 7 Drawing Sheets

METHODS AND SYSTEM FOR IMPLEMENTING PRINT OPTIONS FOR A PRINTING DEVICE USING VISUAL INFORMATION

FIELD OF THE INVENTION

The present invention relates to implementing print options for printing at a printing device using visual information with a user interface.

DESCRIPTION OF THE RELATED ART

Printing devices enumerate capabilities and constraints as text of some form, such as XML, JSON, and the like. Some printing devices use XJDF device capabilities to allow a user or client to dynamically change the available print options to match the printing device configuration. The device capabilities also are used to allow the client to construct the required text, such as using XML, without having to hard code print ticket formatting to the client. Similarly, a print driver can determine the capabilities for a printing device via SNMP, which only returns text, and configures itself accordingly. To implement these processes, the client must understand all of the capabilities that are returned from the device capabilities to include the information needed to present the options to the user.

SUMMARY OF THE INVENTION

A method for providing visual information regarding a printing operation is disclosed. The method includes accessing a device capability file at a printing device. The device capability file includes data corresponding to configuration information for the printing device, a plurality of print options available at the printing device, and at least one constraint for the plurality of print options. Each print option includes a priority value and is associated with an option icon and a preview overlay graphic. The method also includes retrieving the configuration information and the plurality of print options from the device capability file by a client application executing on a client device. The method also includes sequencing each print option of the plurality of print options according to its respective priority value. The method also includes displaying the plurality of print options according to the sequencing in a user interface at the client device. Each of the plurality of print options is identified by its respective option icon. The method also includes selecting a print option of the plurality of print options using the user interface. The method also includes updating a preview of a document by the client application using a preview overlay graphic for the selected print option. The method also includes processing a print job for the document including the selected print option for the printing device.

A printing system is disclosed. The printing system includes a printing device having a device capability file. The device capability file includes data corresponding to configuration information for the printing device, a plurality of print options available at the printing device, and at least one constraint for the plurality of print options. Each print option includes a priority value and is associated with an option icon and a preview overlay graphic. The printing system also includes a client device configured to execute a client application for printing a document. The client application accesses the device capability file at the printing device. The client application is configured to retrieve the configuration information and the plurality of print options from the device capability file. The client application also is configured to display the plurality of print options based on the priority value in a user interface at the client device. Each of the plurality of print options is identified by its respective option icon. The client application also is configured to sequence each print option of the plurality of print options according to its respective priority value. The client application also is configured to select a print option of the plurality of print options using the user interface. The client application also is configured to update a preview of a document by the client application using a preview overlay graphic for the selected print option. The client application also is configured to process a print job for the document including the selected print option for the printing device.

A method for receiving print options for a print job is disclosed. The method includes defining a device capability file at a printing device. The device capability file includes data corresponding to configuration information for the printing device. The device capability file also includes data corresponding to a plurality of print options available at the printing device. Each print option includes a priority value, an option type, a grouping option, an option icon, and a preview overlay graphic. The device capability file also includes at least one constraint for the printing device. The method also includes sequencing each print option of the plurality of print options according to its respective priority value. The method also includes grouping at least one print option of the plurality of print options into a set of print options based on the grouping option of at least one print option. The method also includes displaying at least one print option of the set of print options in a user interface. Each print option of the set of print options is identified by its respective option icon. The method also includes updating a preview of a document by the client application using a preview overlay graphic for the selected print option. The method also includes processing a print job for the document including the selected print option for the printing device.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments propose enhancing device capabilities to include information required to present print options to a user in a rich user interface, as opposed to text described above for use in conventional printing systems. Device capabilities would return the typical information associated with printing operations. This information includes device configuration information that is normally part of capabilities and may include a device mimic Device capabilities also includes device options and the values for the options. They also include device constraints, or value ranges for options and dependencies between options and between the values in the options.

In addition, the disclosed embodiments would add information not found in device capabilities. For each of the print options, the disclosed embodiments define the option sequence or priority. They also define the option type, such as select, checkbox, radio button, and the like. For each of the print options, the disclosed embodiments also define one or more grouping options and corresponding option icons. The disclosed embodiments also define a preview overlay, which may be an icon that can be overlaid on a job preview. The system should have an icon for each relevant option. Options may be finishing operations, such as corner staple. Options also may be related to media, such as tab stock, pre-punched, media size and color, and the like. The icons may be defined in a resolution-independent format such as SVG so that the overlay may be scaled to any preview size.

Conventional device capabilities require a client or print driver that already knows about the constructs that are included in the device capabilities. Thus, while these drivers can support a large number of devices, they only can support devices that are known when the driver is created. Further, the client or print driver may support only device capabilities that are known when the driver is released. This aspect may be acceptable for the office market because printing devices are not usually changed after they are brought to market. In contrast, this aspect may be a problem for the production market wherein customers expect printing devices to gain new functionality over the lifetime of the devices.

The disclosed embodiments address both issues by enabling a driver that works with any printing device that can express capabilities in the required syntax. As such, there may be no need to upgrade drivers when new functionality is added to a product. Similarly, there may be no need to upgrade drivers to support new models of a printing device, including those that support new types of capabilities.

Figure 1A:
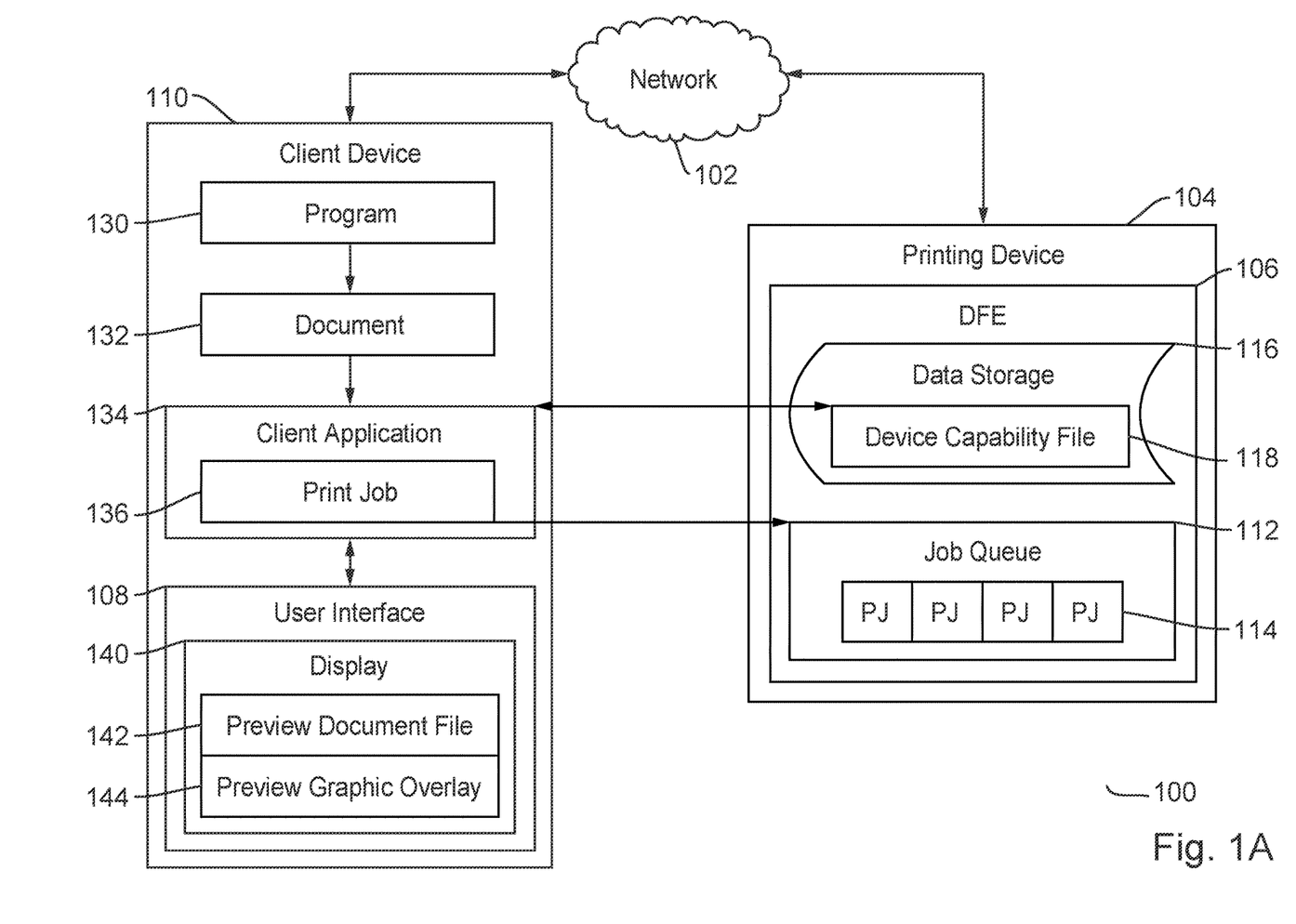
FIG. 1A illustrates a block diagram of a printing system having a printing device connected to a client device according to the disclosed embodiments.

FIG. 1A depicts a printing system 100 having a printing device 104 connected to a client device 110 according to the disclosed embodiments. Printing system 100 includes printing device 104 that received print jobs from client device 110. Client device 110 may be any device capable of executing applications and programs to generate documents and files, such as, for example, a computer, a laptop computer, mobile device or tablet, smart phone, kiosk, and the like. Client device 110 may send print jobs to printing device over one or more networks 102 implemented within printing system 100. More than one client device 110 may be connected to printing device 104.

Network 102 may be used by system 100 to exchange data between devices within system 100. Devices 104 and 110 are configured to communicate with a network 102 over a physical communications interface or layer such as air interfaces and/or a direct wired connection. Air interfaces may be an given cellular communications protocol (e.g., GSM, CDMA, W-CDMA, EVDO, eHRPD, EDGE, 4G LTE, 5G LTE, 5G NR/New Radio, etc.) and, or a wireless IP protocol (e.g., IEEE 802.11 family). Alternatively, network 102 may be a local area network, wide area network, an ad-hoc network. Network 102 allows printing device 104 and client device 110 to exchange data using the appropriate protocol.

Printing device 104 is disclosed in greater detail below. It includes embedded digital front end (DFE) 106, or printing device controller, that is the workflow touchpoint which accepts a print job, or print file, commonly a PDF or PostScript file. DFE 106 converts the file of the print job into a format that print engine 260, disclosed below, can use to lay down the content of the document corresponding to the print job on a media. DFE 106 may include a raster image processor (RIP) as well as other components.

Figure 1B:
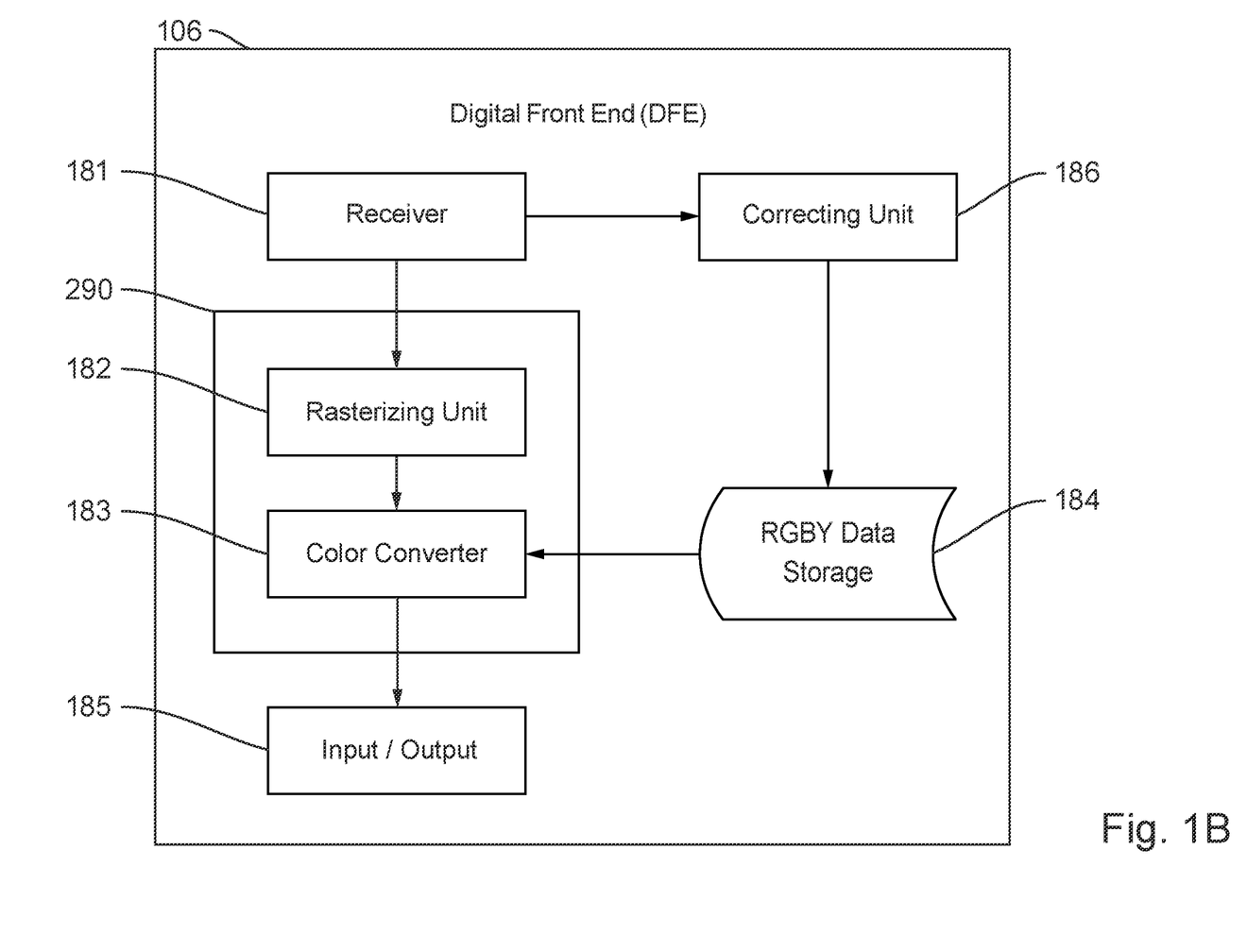
FIG. 1B illustrates a block diagram of an embedded digital front end for the printing device according to the disclosed embodiments.

FIG. 1B depicts a block diagram of DFE 106 according to the disclosed embodiments. DFE 106 includes a receiver 181, a RIP firmware 290 including rasterizing unit 182 and a color converter 183, an RGBY data storage 184, an input/output connector 185, and a correcting unit 186. RIP firmware 290 also is disclosed in FIG. 2. Additional components within DFE 106 may be implemented, including those disclosed in FIG. 1A. DFE 106, therefore, also includes job queue 112 and data storage 116.

Receiver 181 receives a print job generated by client device 110 and outputs the print job to rasterizing unit 182 of RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

Rasterizing unit 182 converts image data associated with the print job into raster data to thereby generate rendering data, and outputs the generated rendering data to color converter 183. Color converter 183 converts the rendering data from rasterizing unit 182 into rendering data in a CMYK format. When the rendering data is originally in the CMYK format, or CMYK rendering data, the conversion may not be performed. Color converter 183 performs gradation conversion of the CMYK rendering data, with reference to one or more tone reproduction curves (TRCs) stored in RGBY data storage 184. A TRC refers to data indicating the relationship between a colored gradation value for rendering data and print color, or print density, on a given print medium.

When print color provided by printing device 104 alters over time, the TRCs stored in RGBY data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in RGBY data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in RGBY data storage 184 is replaced with the generated TRC. Correcting unit 186 may correct the TRC. Correcting unit 186 may rewrite a part of the TRC stored in RGBY data storage 184 to thereby correct the TRC.

RIP firmware 290 include rasterizing unit 182 and color converter 183. The rendering data generated by RIP firmware 290 is transmitted within printing device 104 via input/output connector 185. The print condition information and the print medium type, as well as the rendering data, may be transmitted to engine 260.

Referring back to FIG. 1A, DFE 106 also includes job queue 112. Job queue 112 includes print jobs 114 received for processing as disclosed above. Print jobs 114 may be received from client device 110. Job queue 112 may place them in an order for printing on printing device 104. DFE 106 also includes data storage 116 that stores various files, such as device capability file 118. Device capability file 118 is disclosed in greater detail below.

For example, client device 110 includes program 130 that creates a document 132. Program 130 may be any program that creates content, such as a word processing application. Document 132 may be provided to client application 134 to generate print job 136 with the intent to print on printing device 104. Print job 136 may be submitted to printing device 104 and placed in job queue 112. Thus, client application 134 may be a printer driver that executes on client device 110 to format document 132 into an electronic document, or print job 136.

When client device 110 defines a new print job 136 to submit to DFE 106, it may define the print description language (PDL) files that are part of the print job and job processing instructions, such as hold, print, quantity, media, and the like that will be used to produce the print job. These instructions may be part of the print condition and the print medium type information disclosed above.

For production printing, client device 110 may send print job 136 to be held at printing device 104. The operator may use the same client or a local user interface to identify and release the print jobs. Before this operation, however, client application 134 accesses device capability file 118 at DFE 106. Client application 134 may pull device capability file 118 from DFE 106. Device capability file 118 is disclosed in greater detail. It includes device configuration including a device mimic, device options and the values for the options, device constraints, and print options. This information is provided to client application 134.

As noted above, the information within device capability file 118 differs from conventional device capability files as it is not a text file. It also includes information for each of the print options that includes option sequence or priority, option type, grouping option, option icon, and a preview overlay graphic. Client device 110 and client application 134 may use the information from device capability file 118 to provide the options to the user as well as display a preview document file 142 within display 140 of user interface 108 of the client device. As the user selects various options, preview graphic overlay 144 is shown applied to preview document file 142 within display 140. According to the disclosed embodiments, all the device capability and configuration information for printing device 104 may be retrieved from DFE 106 such that client application 134 or other components on client device 110 do not need to be updated or configured after the client device is released or brought to market.

Client application 134 works with any printing device 104 that can express capabilities using the syntax for device capability file 118. There is no need to upgrade print drivers, such as client application 134, when new functionality is added to printing device 104. Further, client device 110 may connect with another printing device and implement its device capability file without taking up storage or resources within the client device. Expandability of the printing functionality of system 100 may be realized using the disclosed embodiments. Printing device 104 also may work in conjunction with numerous client devices, as they can retrieve device capability file 118 from data storage 116.

Another feature of the disclosed embodiments is the ability to catch incompatible or conflicting options before sending print job 136 to printing device 104. Using device capability file 118 at client application 134, constraints may be imposed on the options selected by the user. For example, an offset for document 132 may not be compatible with the output bin for printing device 104. This conflict is noted on client device 110 and the offset option not allowed. The conflict may be shown on display 140 may not allowing the offset to be applied to preview document file 142. Another offset may be selected and shown as preview graphic overlay 144.

Figure 2:
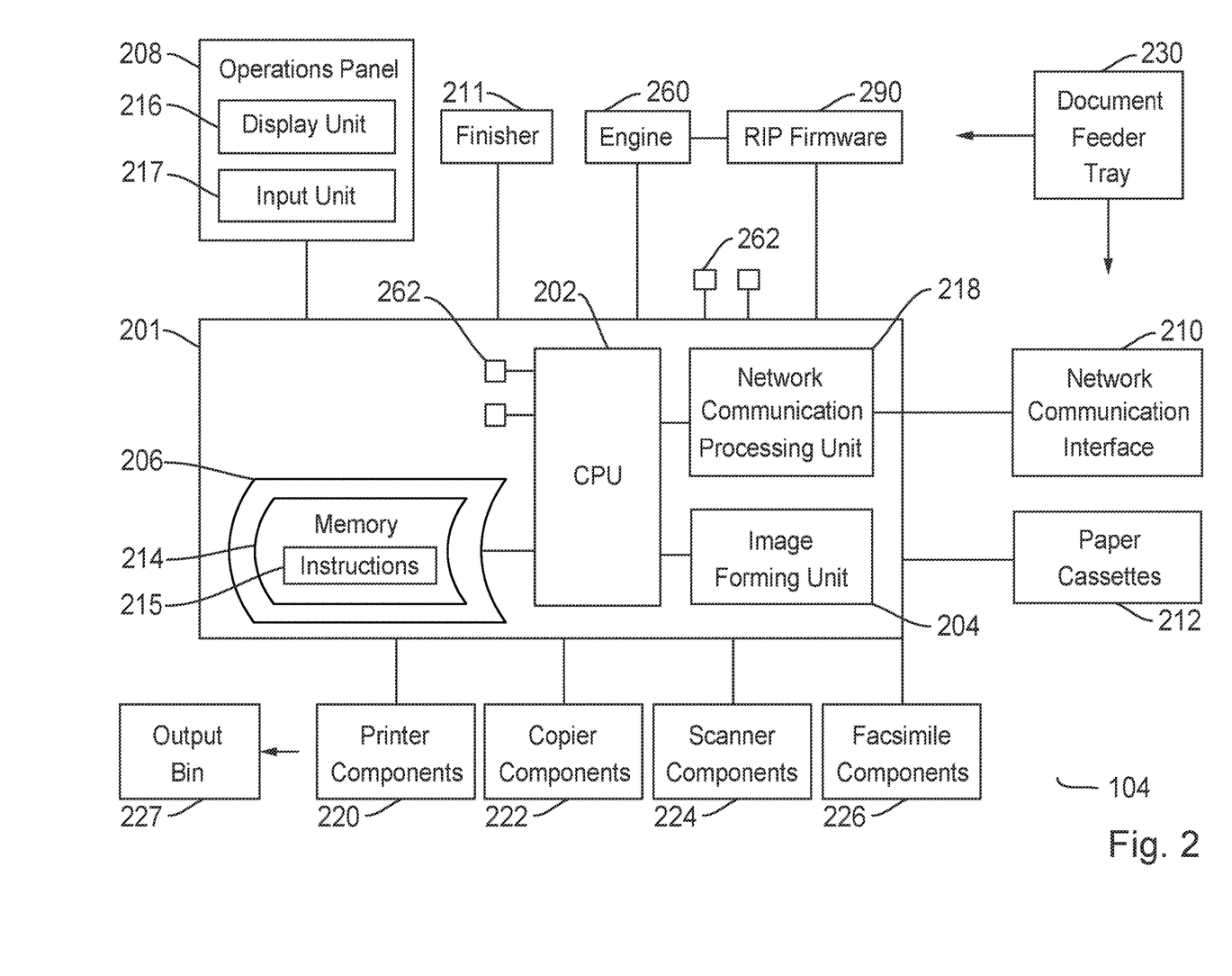
FIG. 2 illustrates a block diagram of components of the printing device for use within the printing system according to the disclosed embodiments.

FIG. 2 depicts a block diagram of components of printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100. As disclosed above, printing device 104 may send and receive data from client device 110 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to various components 220, 222, 224, and 226 to create the image formed surfaces on the papers. Paper cassettes 212 may include papers having various sizes, colors, composition, and the like. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused.

Document processor input feeder tray 230 may include the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104. RIP firmware 290 may be located in DFB 106, as disclosed above.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from client device 110.

Figure 3:
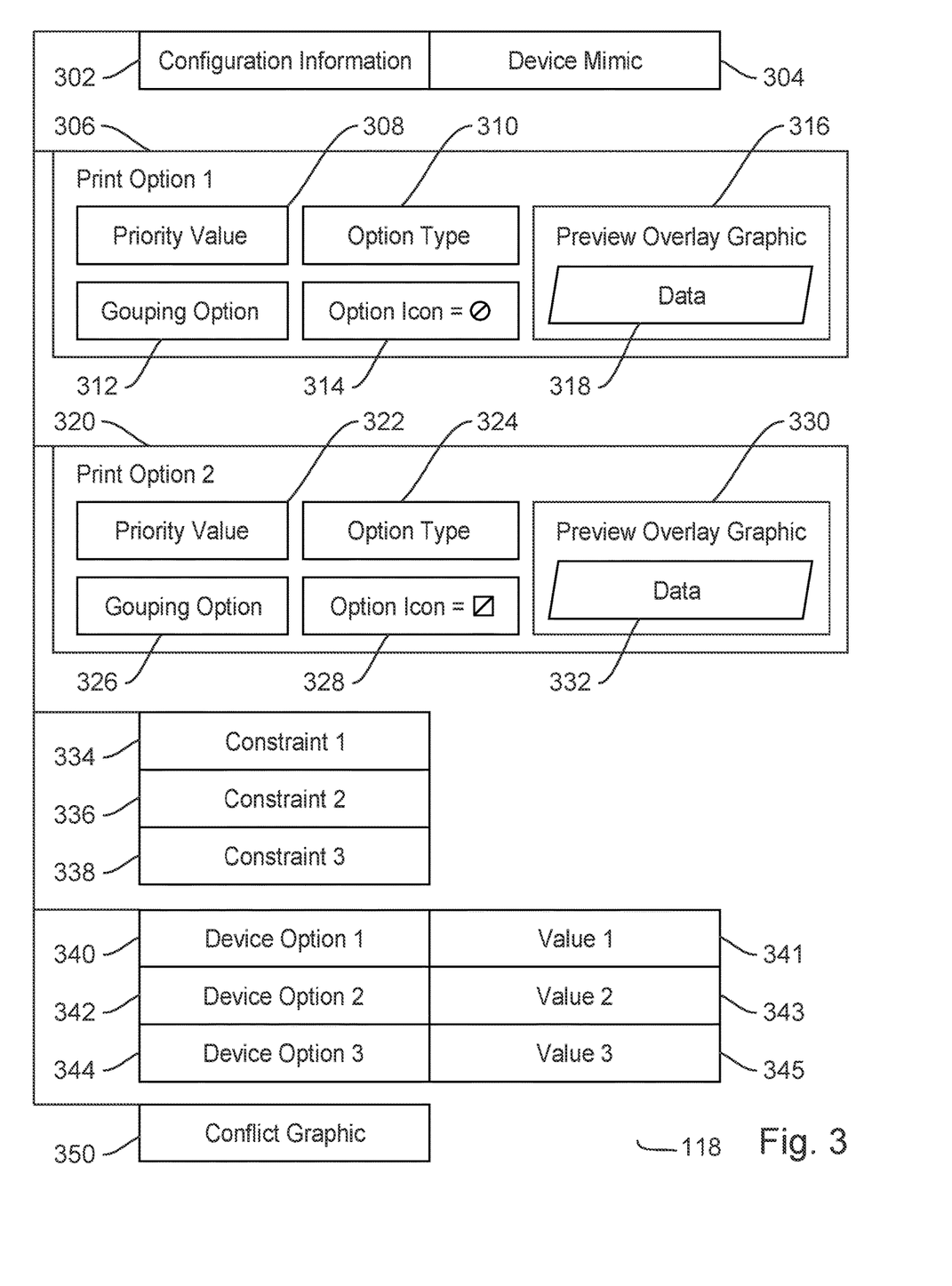
FIG. 3 illustrates a block diagram of a device capability file according to the disclosed embodiments.

FIG. 3 depicts a block diagram of device capability file 118 according to the disclosed embodiments. As disclosed above, device capability file 118 may be stored at printing device 104 in DFE 106. Device capability file 118 may be stored at data storage 116. When client device 110 connects or engages printing device 104, client application 134, which creates print job 136 for document 132, accesses data storage 116 to retrieve a copy of device capability file 118 for use at the client device. Using the data therewithin, client application 134 may present information to the user for performing printing operations using the capabilities and options available at printing device 104.

This feature allows printing operations to act like a custom implementation, even though they are not. Device capability file 118 resides at printing device 104 as opposed to client device 110 or client application 134. Client application 134 is completely agnostic as device capability file 118 controls the functions and printing options available for printing device 104. Further, client application 134 can retrieve copies of other device capability files from other printing devices without the need to store or update such files. Updates may be provided at printing device 104 that may modify device capability file 118 on DFE 106.

Configuration information 302 relates to device configuration for printing device 104. Configuration information 302 is normally provided to client device 110 by printing device 104. Configuration information 302 may include device mimic 304. Device mimic 304 may be data to provide a representation of printing device 104 and available options. Other information provided within device capability file 118 includes device options 340, 342, and 344. Device options 340, 342, and 344 include values 341, 343, and 345, respectively. Device options may not relate directly to print options also provided by device capability file 118.

Capability device file 118 also includes device constraints 334, 336, and 338. Constraints 334, 336, and 338 may include value ranges for device options 340, 342, and 344. In other words, the device options may be limited to these ranges on printing device 104. Constraints 334, 336, and 338 also may include dependencies between the options and between the values in the options. The constraints also may apply to the print options, disclosed below.

In addition to the above information, device capability file 118 includes one or more print options. FIG. 3 depicts print option 306 and print option 320, but may include as many print options as desired. Print options may refer to finishing operations, such as a corner staple for document 132. They also may relate to media, such as tab stock, pre-punched, media size, color, and the like. Print options also may refer to paper size or other dimensions to be applied to print job 136.

Each print option includes defined data that is used by client application 134 to enable the disclosed functionality to printing operations specifically for printing device 104. Referring to print option 306, priority value 308 may indicate the priority assigned to the print option when presenting the options in a sequence. A higher priority value may indicate that print option 306 is to be presented earlier in the sequence of print options using client application 134. Option type 310 may refer to how the option is to be displayed, selected or implemented within user interface 108. For example, the option type may be a select button, a checkbox, a radio button, and the like.

Grouping option 312 may refer to how or if print option 306 is grouped with other similar options. Groups may be built based on capabilities provided by the grouped print options. For example, grouping option 312 may indicate that print option 306 relates to print media and, therefore, should be grouped with similar print media options when presented at client device 110.

Print option 306 also includes an option icon 314 to indicate the print option when displayed. Option icon 314 may uniquely identify print option 306 within device capability file 118. As shown in FIG. 3, option icon 314 may include a graphic or symbol. Print option 306 also includes preview overlay graphic 316, which is used as preview overlay graphic 144 disclosed by FIG. 1A. Preview overlay graphic 316 includes data 318 that allows an icon or graphic to be overlaid on preview document file 142 provided by user interface 108. The disclosed embodiments should have a preview overlay graphic for each relevant print option. Preview overlay graphic 316 may be defined in a resolution-independent format by data 318, such as scalable vector graphics (SVG), so the overlay graphic can be scaled to any preview size. For example, client application 134 and user interface 108 of client device 110 may implement a different preview size for preview document file 142 than another client device.

Print option 320 also is provided within device capability file 118. Print option 320 also may be known as print option 2. Print option 320 includes a similar data set as print option 306. Thus, print option 320 includes its own priority value 322, option type 324, grouping option 326, option icon 328, and preview overlay graphic 330 with its own data 332. Option icon 328 should differ in appearance from option icon 314 for print option 306. Preview overlay graphic 330 also should be different visibly when applied to preview document file 142. In some embodiments, grouping option 326 may be similar to grouping option 312 for print option 306 if the options are related.

Additional data points may be included in print options 306 and 320. Further, constraints 334, 336, and 338 may be defined to be constraints on the print options. For example, if print option 306 is related to certain media size, then constraint 334 may define that output bin 227 cannot be used as it does not accommodate that media size. Constraint 336 may further limit the use of print option 306. If constraint 334 blocks the user of print option 306, then the disclosed embodiments may search similar grouped options to provide to the user. For example, print option 320 may be shown as a viable option if print option 306 is not available for the requested action.

Figure 4:
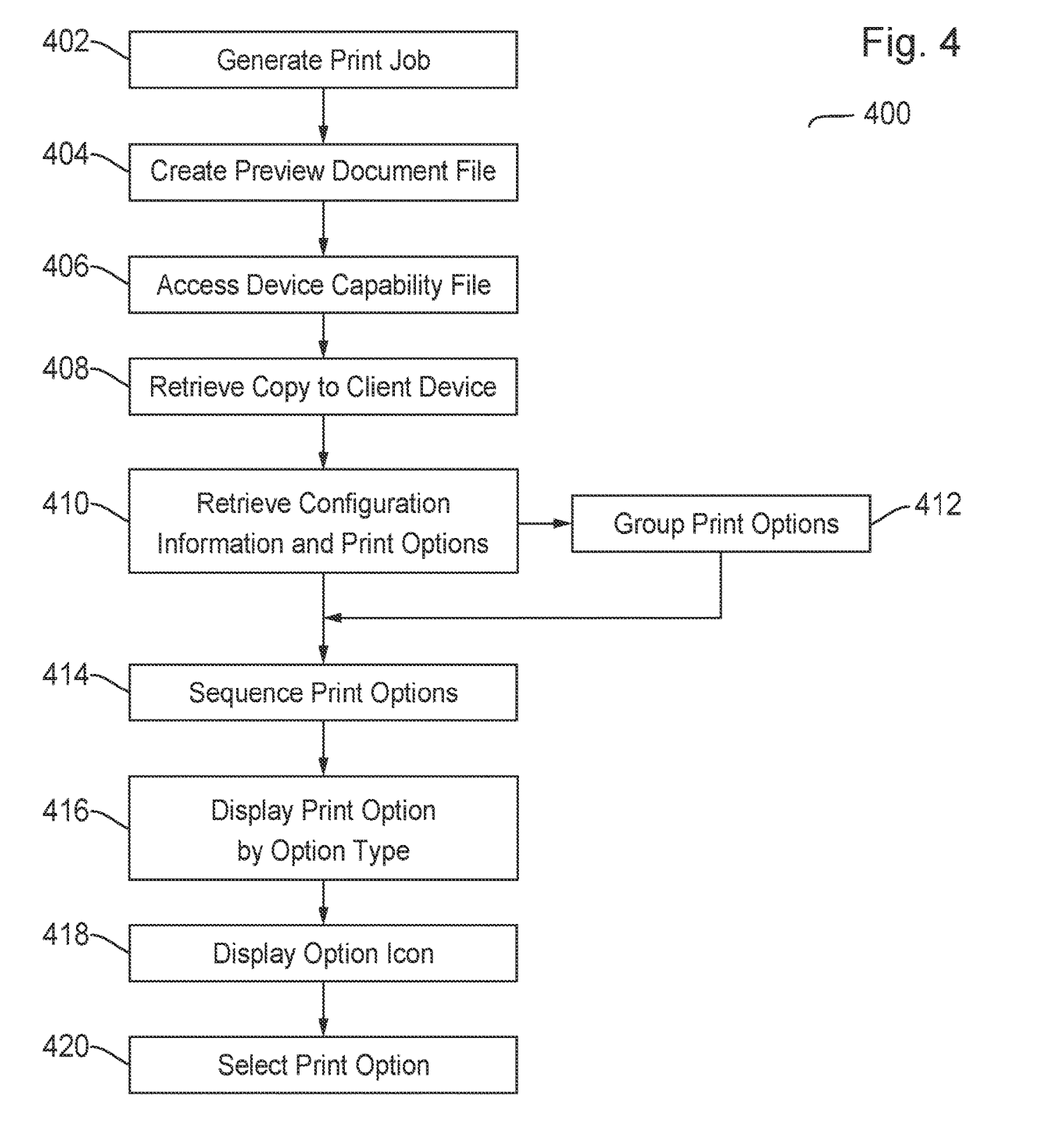
FIG. 4 illustrates a flowchart for implementing print options for a print job according to the disclosed embodiments.

FIG. 4 depicts a flowchart 400 for implementing print options for a print job according to the disclosed embodiments. Flowchart 400 may refer to FIGS. 1A-3 for illustrative purposes. The embodiments disclosed by flowchart 400, however, are not limited by FIGS. 1A-3.

Step 402 executes by generating print job 136 for document 132 by client application 134. In some embodiments, client application 134 may be a printer driver running on client device 110. In other embodiments, client application 134 may be the print preview feature for program 130. Print job 136 may include instructions to print one or more copies of document 132 at printing device 104.

Step 404 executes by creating preview document file 142 for document 132 based on the indication that print job 136 is to be printed. Preview document file 142 may be a graphical representation of document 132, such as pages and text/graphics within the document. Step 406 executes by accessing device capability file 118 at DFE 106 of printing device 104. Once the print preview process is undertaken, client application 134 may send a request to DFE 106 to access device capability file 118 stored thereon in data storage 116. DFE 106 may confirm that client application 134 has permission to access device capability file 118.

Step 408 executes by retrieving a copy of device capability file 118 from DFE 106 to client application 134 at client device 110. Going forward, the copy at client device 110 also will be referred to as device capability file 118. Unlike typical printer drivers, client application 134 does not know anything about printing device 104. Instead, client application 134 retrieves 100% of the print information and options for printing device 104 from device capability file 118. At a minimum, device capability file 118 includes configuration information for printing device 104, a plurality of print options 306 and 320, and constraints 334, 336, and 338 for the plurality of print options. The print options include a priority value and is associated with an option icon and preview overlay graphic. The print options also may include an option type and a grouping option. These features are disclosed above.

Step 410 executes by retrieving configuration information 302 as well device mimic 304 from device capability file 118. Device mimic 304 may be used to help represent printing device 104 and device options 340, 342, and 344 as opposed to pre-existing images. Step 410 also retrieves print options, such as print options 306 and 320. This step is performed at client device 110 by client application 134. Thus, client application 134 does not need to store or have available specific print option information for printing device 104 as this information is provided using device capability file 118 according to the disclosed embodiments.

Flowchart 400 may go to step 412 or directly to step 414. Step 412 executes by groups a set of print options of the plurality of print option based on the grouping option. User interface 108 may group print options based on the capabilities provided therein and noted by the grouping option. The set of print options may be grouped either in sections, tabs, and the like. For example, print option 306 includes grouping option 312 and print option 320 includes grouping option 326. Grouping options 312 and 326 indicate that print options 306 and 320 should be grouped and presented together within user interface 108. Print options 306 and 320, for example, may relate to paper size. Print option 306 may be the option to use letter sized paper while print option 320 may be the option to use legal sized paper. User interface 108 groups these options using a tab that the user may select when previewing print job 136.

Step 414 executes by sequencing the print options of the plurality of print options according to their respective priority values. The sequence of print options would be based on priority. For example, a higher priority would indicate that print option is displayed or made available prior to a lower priority. Referring to FIG. 3, print option 306 includes priority value 308 and print option 320 includes priority value 322. Priority value 308 may indicate print option 306 has a higher priority than priority value 322 for print option 320. Thus, print option 306 may be presented in the sequence of print options before print option 320.

Referring to the set of print options grouped in step 412, priority value 308 may indicate where print option 306 is listed or ranked within the set. In other embodiments, print options 306 and 320 are not grouped together because grouping options 312 and 326 do not permit it. Priority values for the print options allow an order for the sequence of presenting the print options within user interface 108 to be specified and configured.

Step 416 executes by displaying the print options based on the sequencing in user interface 108 at client device 110. As shown in FIG. 1A, preview document file 142 may be shown in display 140. Print options 306 and 320 also are shown on display 140 based on their order in the sequence defined above. If a set of print options are grouped together, then those print options may be displayed. Further, the print options may be displayed by option type, such as select, checkbox, and the like. Print option 306 may be displayed according to option type 310 and print option 320 displayed according to option type 324.

Step 418 executes displaying the option icons for the print options. For each print option within user interface 108, client application 134 would display its respective option icon within user interface 108. For example, print option 306 is indicated by option icon 314 while print option 320 is indicated by option icon 328. Each icon should uniquely identify its print option to avoid confusion.

Step 420 executes by selecting a print option, preferably using the option type or interacting with its option icon. If the print options are grouped together, then the print option may be selected from the set. The selection may be done using user interface 108. The selection of the print option results in further actions being taken using the information provided by device capability file 118, as disclosed below.

Figure 5:
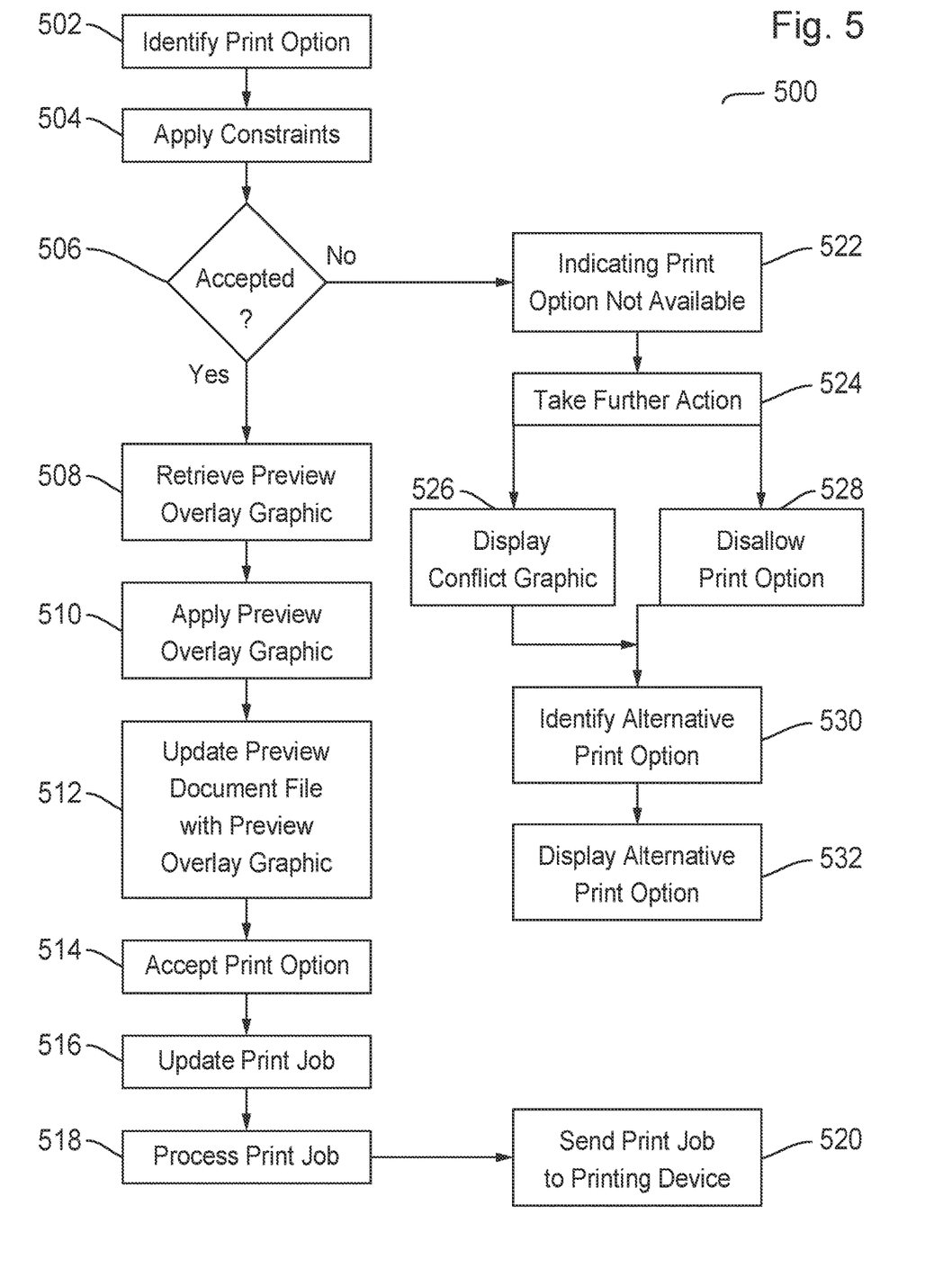
FIG. 5 illustrates a flowchart for providing visual information for a selected print option according to the disclosed embodiments.

FIG. 5 illustrates a flowchart 500 for providing visual information for a selected print option according to the disclosed embodiments. Flowchart 500 may refer to FIGS. 1A-4 for illustrative purposes. The embodiments disclosed by flowchart 500, however, are not limited by FIGS. 1A-4.

Step 502 executes by identifying the print option to implement, as disclosed above. For illustrative purposes, print option 306 will be referred to. Client application 134 may retrieve further information from device capability file 118 about print option 306. Step 504 executes by applying the constraints outlined in device capability file 118 to the print option selected by the user. For example, print option 306 may ask for a value or parameter to be inputted as part of implementing the option. Constraints 334, 336, and 338 are applied against the print option and any related data/metadata. For example, print option 306 may indicate a request for a paper weight over 300 grams per square meter (GSM). Constraint 334 may specify a GSM limit applicable for printing device 104 or an output bin on printing device 104.

Step 506 executes by determining whether print option 306 is acceptable according to the constraints specified by device capability file 118. Using the above example, constraint 334 may include acceptable ranges for paper weight for output bin 227. Print option 306 may specify the paper weight of 300 GSM for print job 136. Print option 320 may indicate the user would like to use output bin 227. Thus, constraint 334 is applied to determine whether print job 136 may be accommodated according to the request. Constrain 334 may include acceptable ranges for paper weights for output bin 227.

If step 506 is yes, then print option 306 may be applied to print job 136. Step 508 executes by retrieving preview overlay graphic 316 for print option 306 by client application 134 from device capability file 118. Preview overlay graphic 316 includes data 318. Step 510 executes by applying preview overlay graphic 316 by client application 134 within user interface 108. Step 512 executes by updating preview document file 142 with preview overlay graphic 316 within user interface 108. Data 318 may be used to generate the graphic applied to the preview. For example, the media dimensions and color may be updated to show how an image would be placed on the media. In other embodiments, preview overlay graphics would show finishing, such as stapling, punching, folding, and the like, and may be placed over preview document file 142.

Step 514 executes by accepting print option 306 by the user using user interface 108, if desired. Acceptance may be made by highlighting the preview overlay graphic or, for example, highlighting option icon 314 or other interface graphic. Step 516 executes by updating print job 136 with print option 306. The selected print option may be made part of print job 306 or added as metadata to the file. Step 518 executes by processing print job 136 including selected print option 306 for printing operations. Step 520 executes by sending print job 136 by client application 134 to printing device 104. In some embodiments, print job 136 is sent to job queue 112 at DFE 106.

If step 506 is no, then constraint 334 does not allow print option 306 to be implemented using user interface 108. Flowchart 500 then proceeds to step 522, which executes by indicating print option 306 is not available for print job 136. In some embodiments, a sound may be made and the print option not applied via client application 134. In other embodiments, step 524 may execute by taking further action to alert the user and resolve the conflict.

For example, step 526 may execute by displaying conflict graphic 350 provided by device capability file 118 within user interface 108 showing the conflict within preview document file 142. Conflict graphic 350 may show how the preview overlay graphic does not work according to device capability file 118 and the constraints for printing device 104. In other embodiments, step 528 may execute by disallowing print option 306 for print job 136. Print option 306 just is not allowed or shown.

Flowchart 500 may proceed from step 526 or 528 to step 530, which executes by identifying an alternative print option to the disallowed print option. For example, the disclosed embodiments may use grouping options or other data within the other print options to propose an alternate selection. Using the above example, grouping option 326 of print option 320 indicates it is related or in the same group as print job 306. Print option 320 may provide for a lighter paper weight for print job 136 that is acceptable. Step 532 executes by displaying print option 320 to the user. Flowchart 500 then may return to one of the previous steps to implement print option 320 using user interface 108, or determining it also is not acceptable under the constraints.

It should be noted that not every print option results in the application of preview overlay graphics or showing something in the user interface. Thus, steps 508 to 512 may be avoided as well as the need to show conflict graphic 350.

Figure 6:
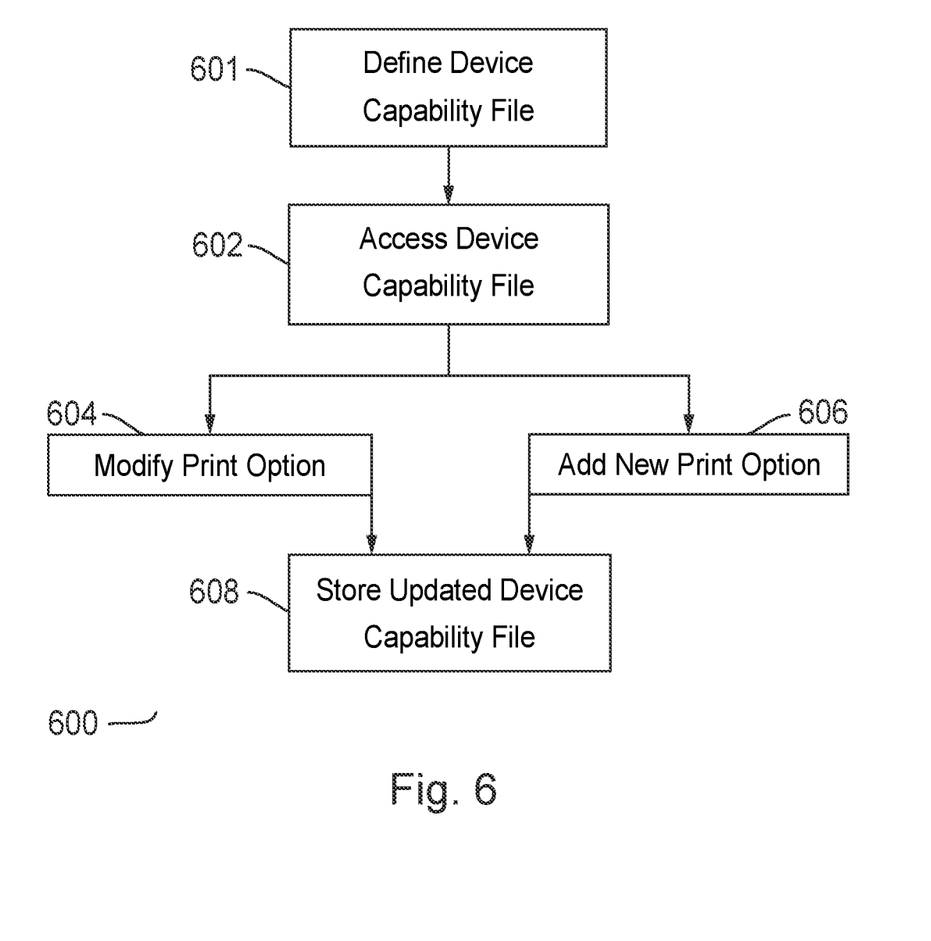
FIG. 6 illustrates a flowchart for updating a device capability file according to the disclosed embodiments.

FIG. 6 illustrates a flowchart 600 for updating device capability file 118 according to the disclosed embodiments. Flowchart 600 may refer to FIGS. 1A-5 for illustrative purposes. The embodiments disclosed by flowchart 600, however, are not limited by FIGS. 1A-5.

Step 601 executes by defining device capability file 118 at DFE 106. As disclosed above, device capability file 118 resides within DFE 106 at printing device 104. A copy is provided to client device 110. Thus, device capability file 118 only needs to be defined, or configured, at one location but may be used within various client devices connected to printing device 104. As disclosed above, device capability file 118 includes data corresponding to configuration information for printing device 104, print options available at printing device 104, and constraints for printing device 104. The print options includes a priority value, an option type, a grouping option a print option icon, and a preview overlay graphic. These features are disclosed above.

Step 602 executes by accessing device capability file 118 at DFE 106. The user may be accessed at printing device 104. In other embodiments, client device 110 may access the file at data storage 116 but does not make a copy such as done with printing operations. Step 604 executes by modifying a print option within device capability file 118. For example, print option 306 may be modified to change priority value 308 or grouping option 312. Alternatively, preview overlay graphic 316 may be updated. Alternatively, step 606 may executes by adding a new print option for printing device 104 to the print options. Step 608 executes by storing the updated device capability file 118 at DFE 106.

Thus, the disclosed embodiments provide a dynamic way to provide and enhance device capabilities to include information to present print options to the user in a rich user interface. The device capability file differs from conventional means that include text files. Further, the disclosed embodiments are device agnostic in that a client device or client application do not need to be configured beforehand and can work with any printing device.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for providing visual information regarding a printing operation, the method comprising:
   accessing a device capability file at a printing device by a printer driver at a client device, wherein the device capability file includes data corresponding to
      configuration information for the printing device,
      a plurality of print options available at the printing device, wherein each print option includes a priority value to rank the print option within the plurality of print options, wherein the print option is associated with an option icon and a preview overlay graphic, and
      at least one constraint for the plurality of print options;
   retrieving the configuration information and the plurality of print options from the device capability file by the printer driver executing on a client device;
   sequencing each print option of the plurality of print options according to its respective priority value;
   displaying the plurality of print options according to the sequencing of the priority values in a user interface at the client device, wherein each of the plurality of print options is identified by its respective option icon;
   selecting a print option of the plurality of print options using the user interface;
   updating a preview of a document by the printer driver using a preview overlay graphic for the selected print option; and
   processing a print job for the document including the selected print option for the printing device.

2. The method of claim 1, further comprising determining the selected print option is not available according to the at least one constraint for the plurality of print options.

3. The method of claim 2, further comprising displaying a conflict graphic based on the preview graphic overlay to indicate that the selected print option is not available.

4. The method of claim 2, further comprising disallowing the selected print option for the print job.

5. The method of claim 2, further comprising displaying an alternative print option based on the selected print option, wherein the alternative print option is available according to the at least one constraint.

6. The method of claim 1, wherein the at least one constraint corresponds to the selected print option not being compatible with another print option.

7. The method of claim 1, further comprising grouping a set of print options of the plurality of print options based on a grouping option.

8. The method of claim 7, wherein the selected print option is selected from the set of print options.

9. The method of claim 1, wherein the configuration information of the printing device includes component information about components of the printing device such that the component information is used to define the plurality of print options.

10. The method of claim 1, further comprising updating the device capability file at the printing device.

11. A printing system comprising:
a printing device having a device capability file, wherein the device capability file includes data corresponding to
configuration information for the printing device,
a plurality of print options available at the printing device, wherein each print option includes a priority value to rank the print option within the plurality of print options, wherein the print option is associated with an option icon and a preview overlay graphic, and
at least one constraint for the plurality of print options; and
a client device configured to execute a printer driver for printing a document, wherein the printer driver accesses the device capability file at the printing device,
wherein the printer driver is configured to
retrieve the configuration information and the plurality of print options from the device capability file;
sequence each print option of the plurality of print options according to its respective priority value;
display the plurality of print options based on the sequence of the priority values in a user interface at the client device, wherein each of the plurality of print options is identified by its respective option icon;
select a print option of the plurality of print options using the user interface;
update a preview of a document by the printer driver using a preview overlay graphic for the selected print option; and
process a print job for the document including the selected print option for the printing device.

12. The printing system of claim 11, wherein the printer driver is further configured to determine the selected print option is not available according to the at least one constraint for the plurality of print options.

13. The printing system of claim 12, wherein the printer driver is further configured to display a conflict graphic based on the preview graphic overlay to indicate that the selected print option is not available.

14. The printing system of claim 12, wherein the printer driver is further configured to disallow the selected print option for the document.

15. The printing system of claim 12, wherein the printer driver is further configured to display an alternative print option based on the selected print option, wherein the alternative print option is available according to the at least one constraint.

16. The printing system of claim 11, wherein the printer driver is further configured to group a set of print options of the plurality of print options based on a grouping option.

17. A method for receiving print options for a print job, the method comprising:
defining a device capability file at a printing device, wherein the device capability file includes data corresponding to
configuration information for the printing device,
a plurality of print options available at the printing device, wherein each print option includes
a priority value to rank the print option within the plurality of print options,
an option type,
a grouping option,
an option icon, and
a preview overlay graphic, and
at least one constraint for the printing device;
retrieving the configuration information and the plurality of print options from the device capability file by the printer driver executing on a client device;
sequencing each print option of the plurality of print options according to its respective priority value at the printer driver;
grouping at least one print option of the plurality of print options into a set of print options based on the grouping option of the at least one print option at the printer driver;
displaying the at least one print option of the set of print options according to the sequenced priority values in a user interface at the client device, wherein each print option of the set of print options is identified by its respective option icon;
updating a preview of a document by the client application using a preview overlay graphic for the selected print option; and
processing a print job for the document including the selected print option for the printing device.

18. The method of claim 17, further comprising determining the selected print option is not available according to the at least one constraint for the plurality of print options.

19. The method of claim 18, further comprising displaying a conflict graphic based on the preview graphic overlay to indicate that the selected print option is not available.

20. The method of claim 18, further comprising disallowing the selected print option for the document.

* * * * *